US011081303B2

(12) United States Patent
Volkmann et al.

(10) Patent No.: US 11,081,303 B2
(45) Date of Patent: Aug. 3, 2021

(54) HIGH VOLTAGE ELECTRIC LINE CUTTER DEVICE

(71) Applicant: Key Safety Systems, Inc., Auburn Hills, MI (US)

(72) Inventors: Matthias Volkmann, Kronberg (DE); Martin Pieruch, Hochheim (DE); Heiko Struss, Holzhausen a.d. Haide (DE); Alois Mauthofer, Alzenau (DE)

(73) Assignee: Key Safety Systems, Inc., Auburn Hills, MI (US)

(*) Notice: Subject to any disclaimer, the term of this patent is extended or adjusted under 35 U.S.C. 154(b) by 0 days.

(21) Appl. No.: 16/814,950

(22) Filed: Mar. 10, 2020

(65) Prior Publication Data

US 2020/0350131 A1 Nov. 5, 2020

Related U.S. Application Data

(63) Continuation of application No. 16/150,486, filed on Oct. 3, 2018, now Pat. No. 10,622,176.

(Continued)

(51) Int. Cl.

*H01H 39/00* (2006.01)
*H01H 71/02* (2006.01)

(Continued)

(52) U.S. Cl.

CPC .......... *H01H 39/006* (2013.01); *B23D 15/14* (2013.01); *B23D 15/145* (2013.01);

(Continued)

(58) Field of Classification Search

CPC .... H01H 39/006; H01H 71/025; H01H 11/00; H01H 71/02; H01H 50/546;

(Continued)

(56) References Cited

U.S. PATENT DOCUMENTS 2,936,331 A 5/1960 Sillers
3,003,045 A 10/1961 Tichenor (Continued)

FOREIGN PATENT DOCUMENTS

| | | |
|---|---|---|
| CN | 104698972 | 6/2015 |
| DE | 102015204028 | 9/2015 |
| JP | 2002512422 | 4/2002 |

*Primary Examiner* — Anatoly Vortman

(74) *Attorney, Agent, or Firm* — Meunier Carlin & Curfman LLC

(57) ABSTRACT

An electric line cutter device for high voltage busbars has a two-part housing, a piston, an igniter and a busbar. The upper housing includes a cylinder, cuboid or prism chamber. The lower housing also includes a cylinder, cuboid or prism chamber. The piston is contained inside one of either the upper housing chamber or the lower housing chamber. Upon igniting the igniter, the piston breaks a portion of the busbar moving the piston and the portion of the busbar into the opposite chamber thereby stopping the electric current flow. The piston is at least partially formed as an insulator to prevent electric discharge. The piston design together with chamber design includes integrated "squeeze areas" and "blow channels" for the appearing arc. A channel system outside or from inside the piston allow the pyro gases to push the arc plasma into a filter system to cool down the gases.

16 Claims, 13 Drawing Sheets

Related U.S. Application Data

(60) Provisional application No. 62/570,978, filed on Oct. 11, 2017.

(51) Int. Cl.
*H01H 50/54* (2006.01)
*B60L 3/04* (2006.01)
*H02B 1/20* (2006.01)
*B23D 15/14* (2006.01)
*B60L 3/00* (2019.01)

(52) U.S. Cl.
CPC ............... *B60L 3/0007* (2013.01); *B60L 3/04* (2013.01); *H01H 50/546* (2013.01); *H01H 71/02* (2013.01); *H02B 1/20* (2013.01); *H01H 2039/008* (2013.01)

(58) Field of Classification Search
CPC . H01H 2039/008; B60L 11/1851; B60L 3/04; H02B 1/20; B23D 15/14
USPC .......................................................... 337/157
See application file for complete search history.

(56) References Cited

U.S. PATENT DOCUMENTS 3,277,255 A 10/1966 Valentin et al.
3,369,296 A * 2/1968 Takahashi ............ H01H 39/006 30/228
3,393,605 A 7/1968 Parnell
3,848,100 A 11/1974 Kozorezov et al.
3,873,786 A 3/1975 Lagofun
4,224,487 A 9/1980 Simonsen
4,417,519 A 11/1983 Lutz
5,535,842 A 7/1996 Richter et al.
5,877,563 A 3/1999 Krappel et al.
6,078,108 A * 6/2000 Froschl .................. H01H 1/365 200/400
6,144,111 A * 11/2000 Krappel ................. H01H 39/00 307/10.1
6,194,988 B1 2/2001 Yamaguchi et al.
6,232,568 B1 5/2001 Hasegawa et al.
6,411,190 B1 6/2002 Yamaguchi et al.
6,556,119 B1 4/2003 Lell
6,843,157 B2 1/2005 Hamilton et al.
7,078,635 B2 7/2006 Kordel et al.
7,123,124 B2 10/2006 Caruso et al.
7,205,879 B2 4/2007 Kordel et al.
7,222,561 B2 5/2007 Brede et al.
7,239,225 B2 7/2007 Tirmizi
7,511,600 B2 * 3/2009 Von Behr ............. H01H 39/006 200/61.08
8,653,386 B2 2/2014 Ukon et al.
8,957,335 B2 * 2/2015 Sprenger .............. B23D 15/145 200/61.04
9,153,402 B2 10/2015 Ukon et al.
9,221,343 B2 12/2015 Tokarz et al.
9,236,208 B2 1/2016 Ukon et al.
9,324,522 B2 4/2016 Nakamura et al.
9,419,424 B2 8/2016 Karnbach et al.
9,425,010 B2 * 8/2016 Hentschel ............ H01H 39/006
9,953,783 B2 * 4/2018 Fellmer ................ H01H 39/006
10,418,212 B2 * 9/2019 Warenits .................. H01H 9/30
2004/0221638 A1 11/2004 Brede et al.
2010/0218659 A1 9/2010 Ukon et al.
2010/0328014 A1 * 12/2010 Suzuki ................... H01H 39/00 337/30
2013/0056344 A1 3/2013 Borg
2013/0175144 A1 * 7/2013 Sprenger .............. H01H 39/006 200/61.08
2013/0263715 A1 10/2013 Ukon et al.
2014/0118887 A1 5/2014 Deb
2015/0116911 A1 4/2015 Sharma et al.
2016/0190777 A1 6/2016 Faber et al.
2016/0343524 A1 * 11/2016 Gaudinat ............. H01H 39/006
2017/0263403 A1 9/2017 Marlin et al.

* cited by examiner

HIGH VOLTAGE ELECTRIC LINE CUTTER DEVICE

CROSS-REFERENCE TO RELATED APPLICATIONS

This application is a continuation of U.S. patent application Ser. No. 16/150,486, filed Oct. 3, 2018, which claims the benefit of U.S. Provisional Patent Application No. 62/570,978, filed Oct. 11, 2017, both of which are expressly incorporated herein by reference in their entirety.

FIELD OF THE INVENTION

The present invention relates to a device for extremely rapid termination of very high voltages and currents. More particularly, a device that upon a sensed signal can disrupt current flow in milliseconds. The device is particularly useful in vehicle crashes, more particularly, electric vehicle crashes. In general, the device also allows for protection from damages and risks by short cuts of high voltage batteries where the device can also be used for stationary batteries, not only for batteries in electric vehicles.

BACKGROUND OF THE INVENTION

The use of hybrid and fully electric powered vehicles means a bank of batteries carrying very high voltages is required. In the event of a vehicle crash, the electrical current flowing from the batteries can become a serious hazard particularly as the current flows can be shorted to electrify a vehicle chassis with very high voltage. This creates a hazard for the occupants as well as emergency personnel responding to the accident. The possibility of electrocution or of the combustion of flammable material is an extreme risk. Ideally, the risk can be minimized if the flow of electricity can be disrupted, preferably near the source or in the case of electric vehicles, near the batteries.

A manual off switch is unreliable for many reasons, because the driver may be incapacitated and emergency personnel may not be able to safely access such a switch.

An object of the present invention is to have the disruption of high voltage electrical currents to occur automatically in the event of a crash and to do so in a very low cost and reliable way to protect the vehicle, its occupants and those emergency personnel responding to the accident.

An important feature of this invention is the ability to simultaneously extinguish the electrical arcs by a gas flow immediately after the cutting event and the heat cooling by the filters while containing the electrical arcs between piston and cylinder.

SUMMARY OF THE INVENTION

An electric line cutter device for high voltage busbars has a two-part housing, a piston, an igniter and a busbar. The upper housing includes a cylinder, cuboid or prism chamber. The lower housing also includes a cylinder, cuboid or a prism of any other polygonal shape chamber. The lower housing is affixed to the upper housing. The piston is contained inside one of either the upper housing chamber or the lower housing chamber. The igniter is for driving the piston from one chamber to the other chamber. The busbar is for carrying an electric current flow and is rigidly held between the upper and lower housing and spanning across said chambers. Upon igniting the igniter, the piston breaks a portion of the busbar moving the piston and the portion of the busbar into the opposite chamber thereby stopping the electric current flow. The piston is at least partially formed as an insulator to prevent electric discharge. The upper and lower housing are made at least partially, if not entirely, non-electrically conductive.

The upper and lower housing are removably attached to the other by one or more fasteners. The busbar is held rigidly by a compression force between the upper and lower housing on two opposed sides of the chamber so, when the busbar is broken, the stub ends of the busbar remain rigidly held at the two opposed sides.

The busbar has two stub ends extending external of the upper and lower housings. Each of the stub ends is configured to be attached to electrical wiring or cable to complete a circuit. The busbar further has a pair of fracture locations, each fracture location being internal and adjacent to the upper and lower housings and of a reduced thickness when viewed in a cross-section of the busbar, the fracture location configured to break upon an impact from the piston.

The igniter is electrically activated in the event of a signal from a sensor. In a preferred embodiment, the electric line cutter device is configured to be used in a vehicle capable of generating high voltages wherein the electric line cutter device is activated by the sensor in the event of a vehicle crash. The igniter preferably is a pyrotechnic device and further comprises a propellant charge squib. The upper or lower housing further comprises one or more blow-out vent passages extending from inside the chamber externally out through one of said upper or lower housings. The electric line cutter device preferably has a filter to capture debris generated during the breaking of the busbar and in particular to cool down and deionize the plasma. The filter is made of a high temperature resistant material, preferably, steel or woven steel.

BRIEF DESCRIPTION OF THE DRAWINGS

The invention will be described by way of example and with reference to the accompanying drawings in which.

DETAILED DESCRIPTION OF THE INVENTION

Figure 1:
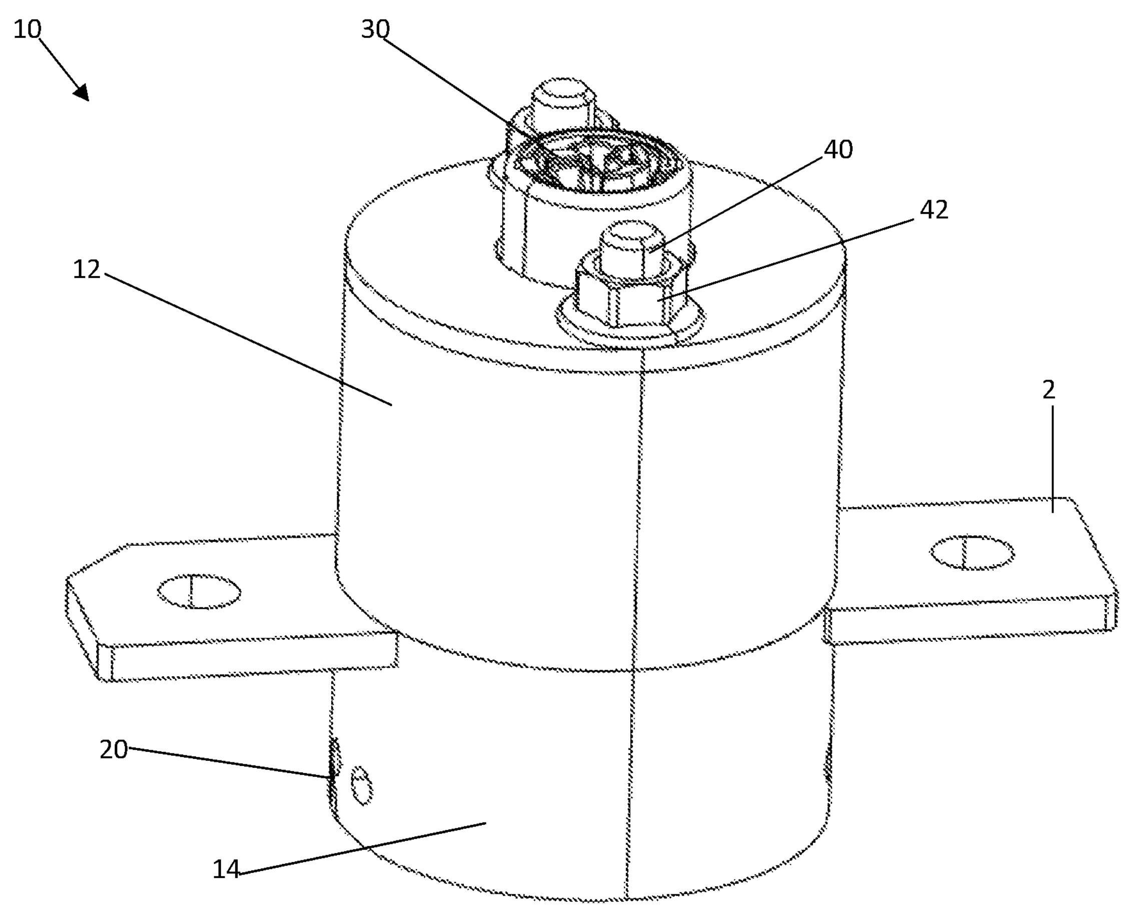
FIG. 1 is a frontal perspective view of the electric line cutter device of the present invention.
Figure 2:
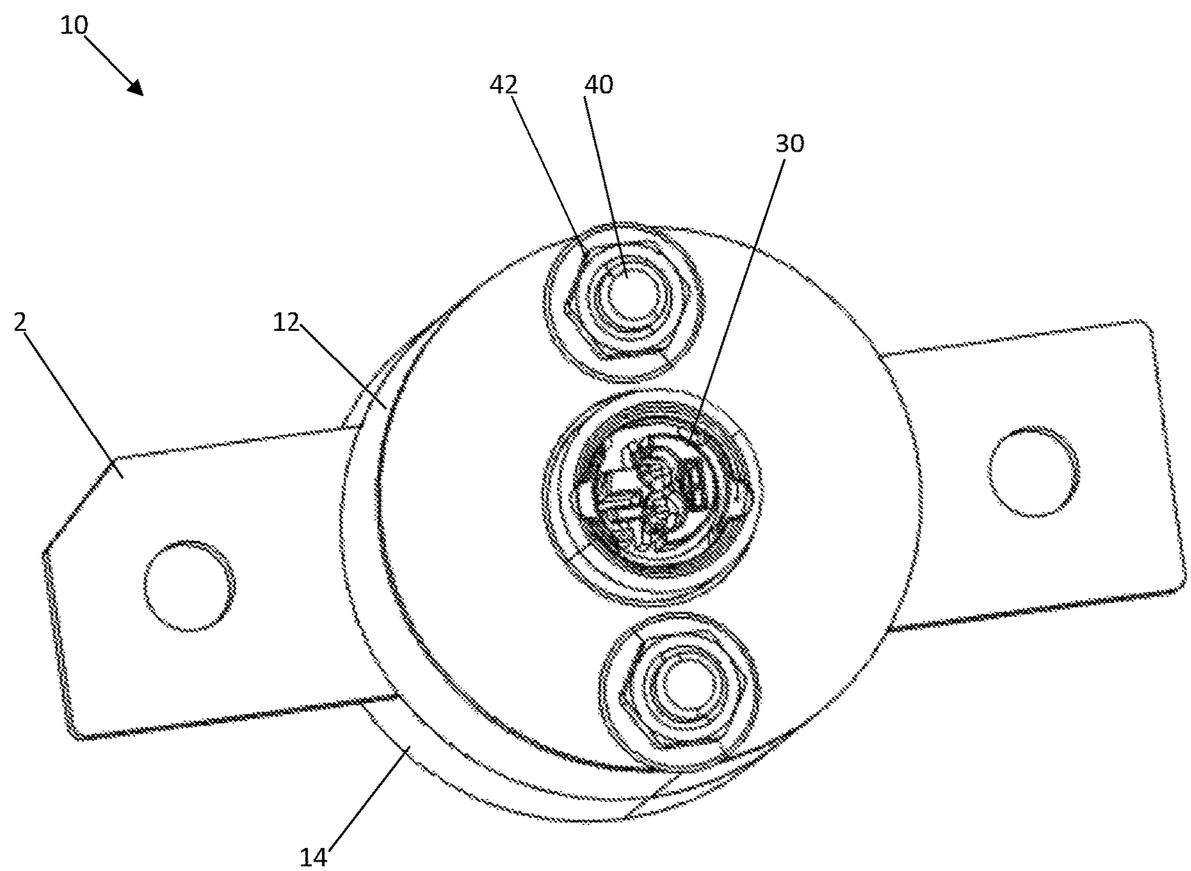
FIG. 2 is a top perspective view of the device of FIG. 1.

An electric line cutter device 10 for high voltage busbars 2 is illustrated in FIGS. 1-4. The device 10 has an upper housing 12 and a lower housing 14. Sandwiched between the upper 12 and lower housing 14 is a busbar 2. The busbar 2 is designed to carry high voltage currents and can be used as a means for carrying power from a battery system to the various components of a vehicle as way of example.

Shown at a top portion of the device 10 are electrical connections for an igniter 30. As illustrated in FIG. 1, the two housing parts 12, 14 are held together by fasteners 40 when tightened by threaded nuts 42. This is also illustrated in the cross-sectional view of FIG. 3.

Figure 3:
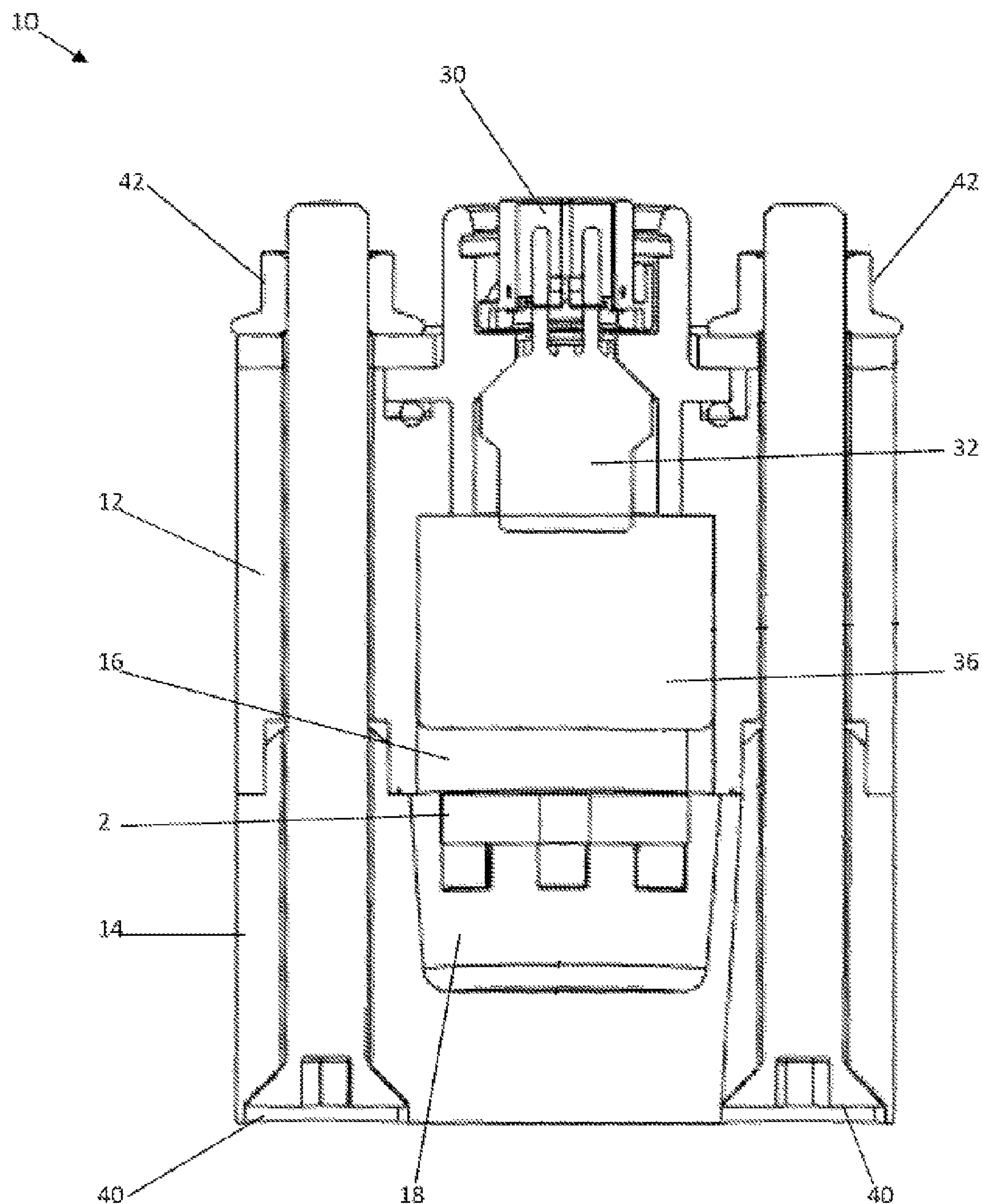
FIG. 3 is a first cross-sectional view of the device of FIG. 1 showing the attachment fasteners.

With reference to FIG. 3, the fasteners 40 when engaging the nut 42 extend through the lower housing 14 and upper housing 12 and when tightened clamp tightly about the busbar 2. As shown, the igniter 30 further includes a squib 32 with propellant. This forms a pyrotechnic device that is capable to propel a piston 36 contained within chambers 16, 18. As shown in FIG. 3, the piston 36 is contained in chamber 16 of the upper housing 12. The chamber 18 the lower housing 14 is shown with a slight inward taper, as illustrated in FIG. 3. When the igniter 30 is activated by an electronic signal sent from a vehicle crash detection system 50 such as an Airbag Electronic Control Unit/Airbag ECU", if an airbag sensor doesn't exist, then it's a crash sensor/acceleration sensor, the squib 32 fires the propellant and propels the piston 36 toward the busbar 2. If there is a fire in the vehicle, the busbar can be cut when the cutter gets a defined signal. A pyrotechnical actuator separates electric high voltage battery connection in an electric vehicle irreversibly from the drive train. It is triggered by the Airbag ECU in case of a crash to prevent electric shock hazards or fires due to overcharge of battery or short circuits within the system. The ignitor receives a certain current of for example, 1.75 A for a certain time, such as 500 msec.

Figure 4:
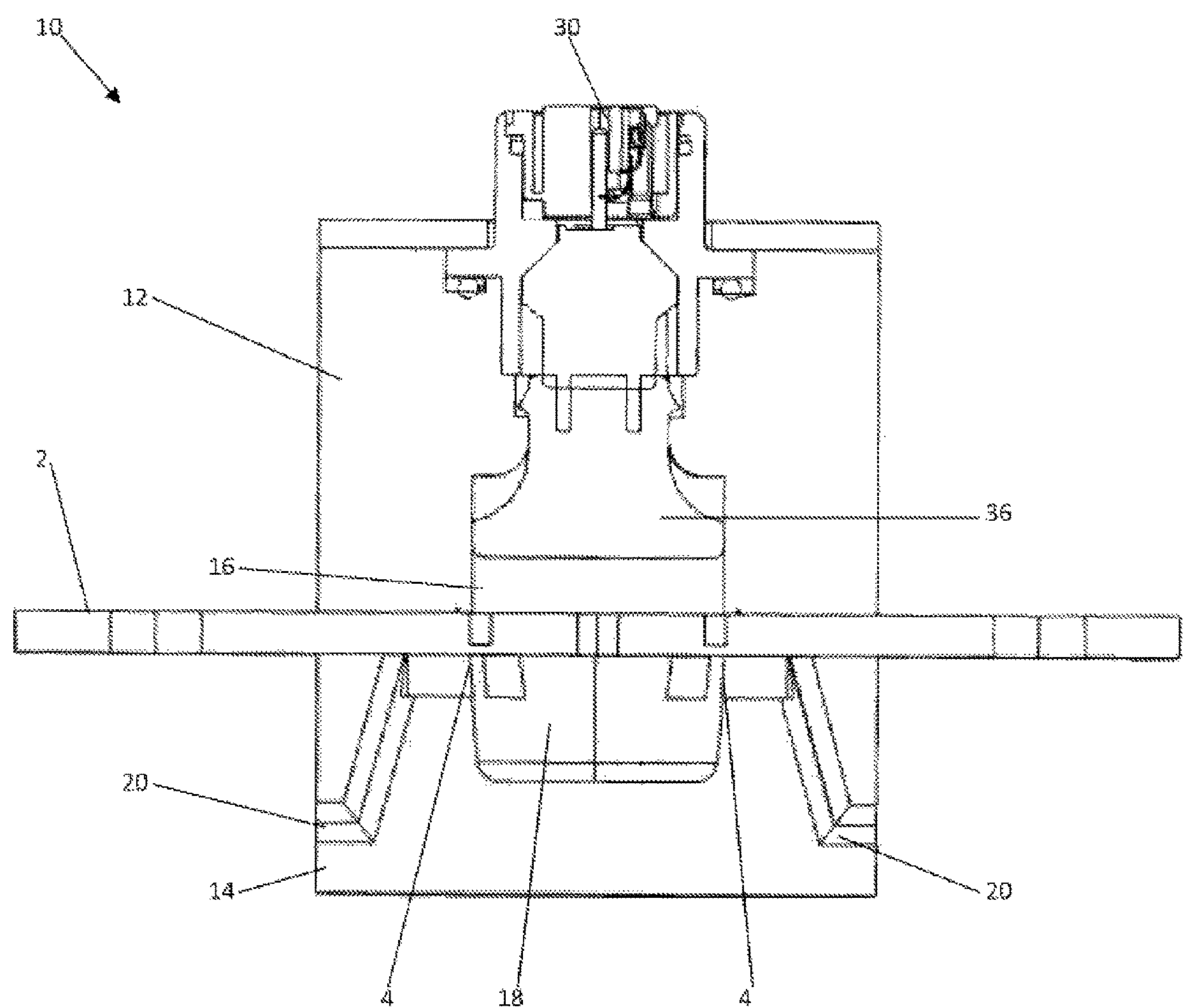
FIG. 4 is a second cross-sectional view showing the busbar being rigidly held.
Figure 5A:
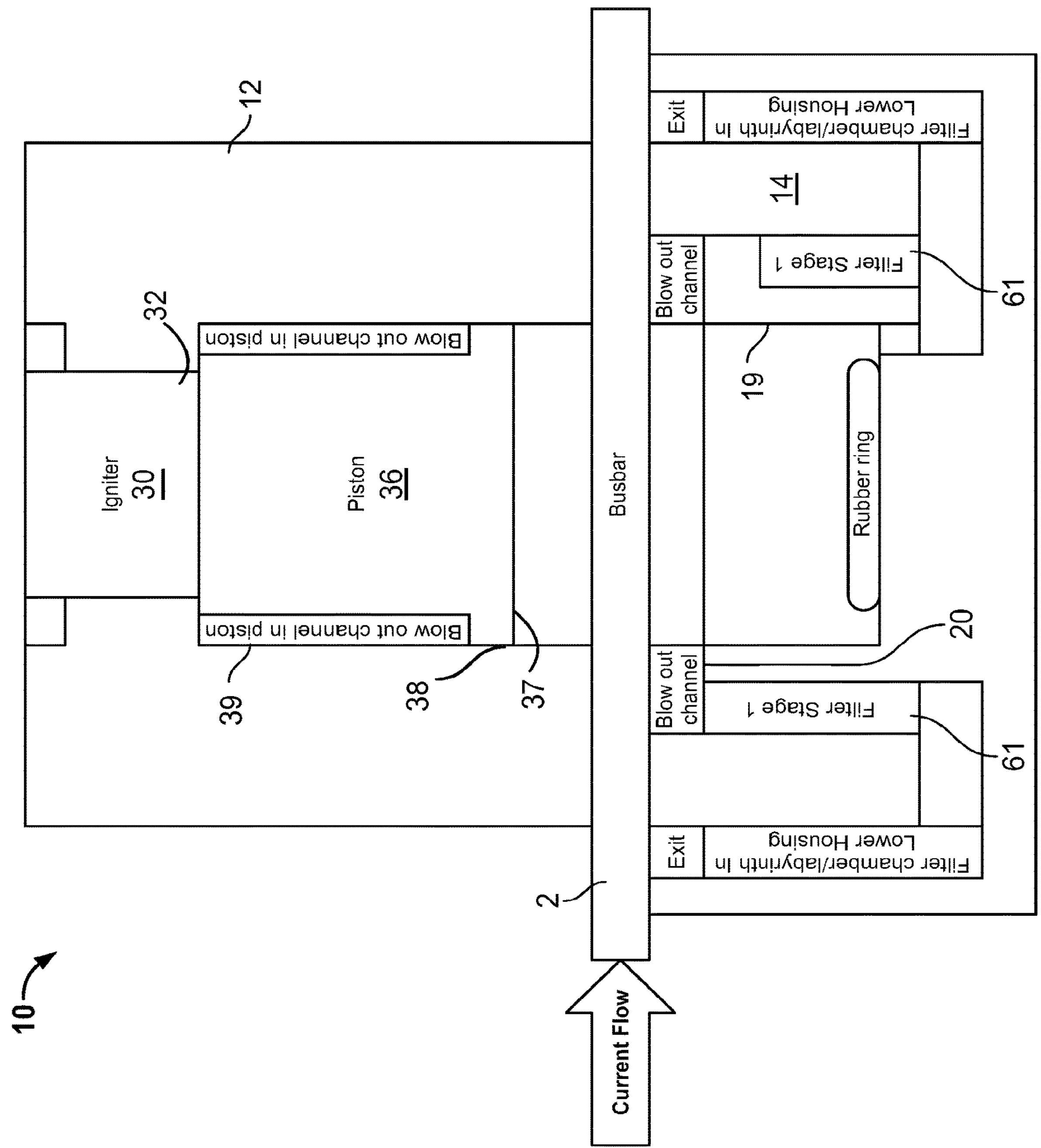
FIG. 5A is a schematic view of the device showing the busbar in closed mode allowing current flow.
Figure 5B:
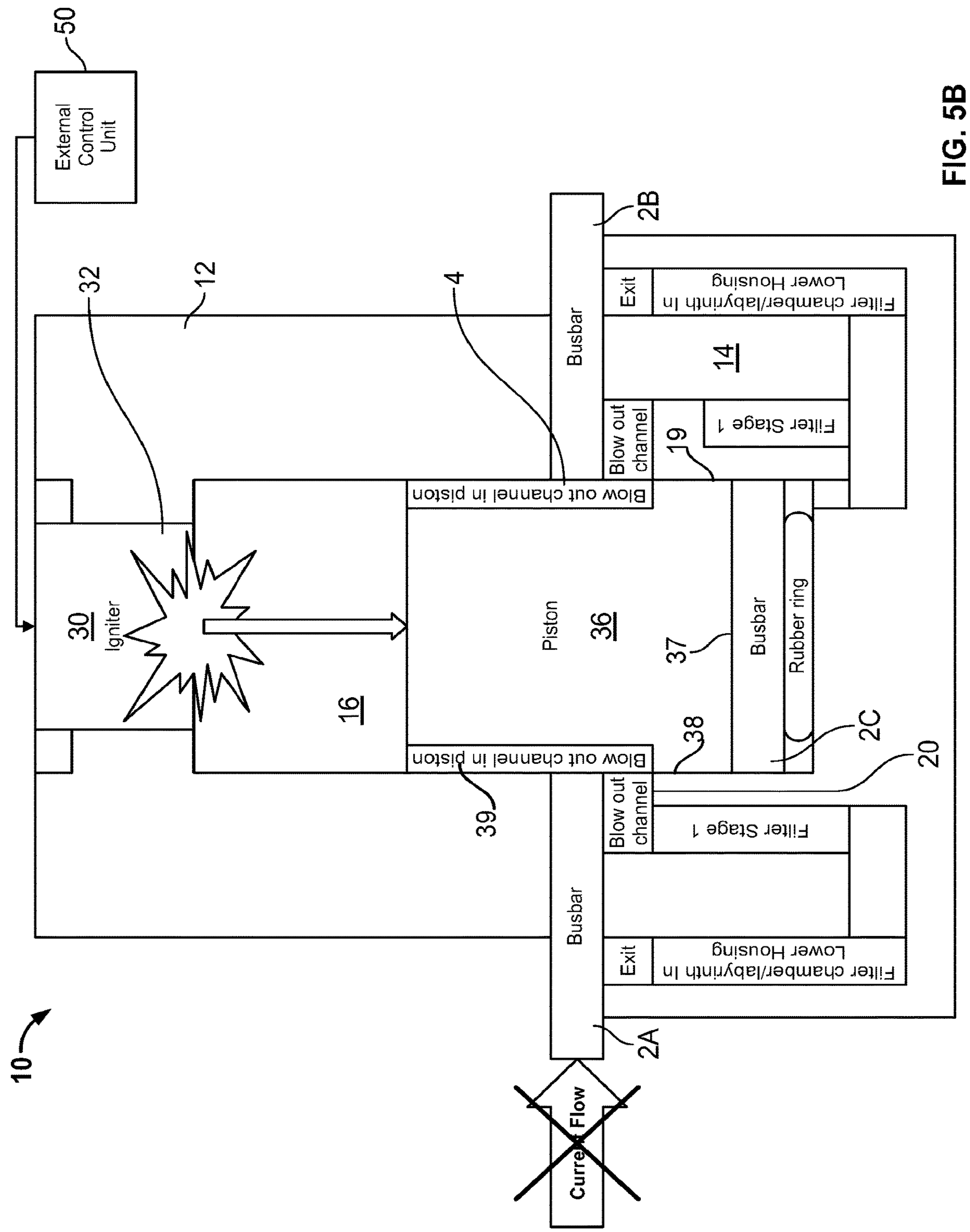
FIG. 5B is a schematic view of the device showing the busbar in open mode disrupting current flow.

The busbar 2, as illustrated in FIG. 4, has a pair of fracture locations 4 on each side of the busbar 2. These fracture locations 4 are reduced thickness sections of the busbar 2 capable of carrying the current, but providing a means of fracturing the busbar 2 in two parts thereby disrupting the current flow, best illustrated in FIG. 5B. Under normal operating conditions, the busbar 2 is a continuous piece, however, during a vehicle crash, the igniter 30 receives a specific signal from a crash detection system 50 or from another control unit such as the safety computer or airbag ECU, preferably an airbag crash detection system and is activated. When this occurs, the piston 36 is driven downward into the chamber 18 as will be discussed later. During this fracturing of the busbar 2 and disruption of the current, arcs can occur. These arcs create discharges and gas discharges inside the electric cutter device 10, as such these gases can be dispelled through passages 20 that create open vent passages to allow the gas to discharge. The piston 36 is made of non-conductive material (typically plastic). The material may also be ceramic. The piston 36 has several functions: Transformation of the gas pressure from the igniter 30 into kinetic energy of the piston 36; Cutting of the busbar electrical insulation of the two busbar stub ends 2A, 2B after cutting; Division of the current into two separate current flows and electric arcs; Extension of the arcs by moving the cut-out busbar part 2C away from the power rail stub ends 2A, 2B.

The object of the present invention is to be able to switch off very high currents up to 16 kA and voltages up to 1000 V in a very small space in a very short time <2 msec.

The task is solved by a galvanic separation of a busbar 2 using a pyrotechnic device 30, 32, 36 and by extinguishing the electric arc using simultaneously several methods: extension of the arc with simultaneous cooling and squeezing.

The busbar 2 which is mounted between high voltage battery and the power consumption devices is embedded an upper housing 12 and lower housing 14 in insulation material. The high voltage-electric line cutter (HV-ELC) device 10 in closed mode allows current flow over the busbar 2 with very low resistance. In the case of a short circuit in the high voltage, HV, system of the vehicle, an external control unit 50 ignites a pyrotechnic propulsion unit in the upper housing 12 of the HV-ELC, which then accelerates an insulating piston 36 downwards. The piston 36 separates a part 2C of the busbar 2 at fracture locations 4 and moves between the two busbar stub ends 2A, 2B so that the current flow is interrupted.

The HV-ELC device 10 consists essentially of a busbar 2, a pyrotechnic igniter 30, an insulating piston 36, an upper housing 12, a lower housing 14 and an optional filter system.

The busbar 2 is designed in such a way that in normal operating mode it conducts the current of the high-voltage system in the vehicle from the high-voltage battery to the HV consumers with a minimum resistance. The main function of the HV-ELC device 10 is the rapid interruption of this circuit after external trigger within less than 2 msec. For this purpose, the pyrotechnic igniter 30 is installed in the upper housing 12 of the HV-ELC device 10. The igniter 30 is connected to an external airbag electronic control unit 50 which, in an emergency case, sends a defined ignition signal to the igniter 30. The low-voltage ignition circuit is separated from the high-voltage circuit by the insulating housing of the device 10. The current of the ignition signal melts a wire in the igniter 30, causing a propellant stored in a squib 32 to be ignited in about 0.2-0.3 msec. The propellant can expand into a chamber or space 16 under the igniter 30. A movable piston 36 is mounted directly under the igniter 30. The piston is accelerated downwards by the pressure of the hot gases. The busbar 2 has a reduced cross-section in two places for easier cutting called fracture locations 4. As soon as the accelerated piston 36 impacts on this busbar 2 at this section, it separates this fractured part 2C and pushes it further downwards. At high levels of current, the current continues to flow through an electric arc despite the fact that a part of the busbar 2 has been disconnected. The arc must be extinguished as soon as possible, by extending, cooling and/or squeezing the arc.

The HV-ELC device 10 uses several of these methods. The insulating piston 36 includes a side portion 38 and an end portion 37. The insulating piston 36 slides between the two busbar stub ends 2A, 2B, and the end portion 37 of the piston 36 thereby moves the center bus bar part 2C away from the stub ends 2A, 2B. The arc is lengthened. Due to the tight fit of the side portion 38 of the piston 36 and cylinder chamber 18, the arc is "squeezed" down to a small gap. In the side portion 38 of the piston 36 and in the outer walls of the chamber 18 directly under the busbar 2C, gas channels 20 for the hot gas are provided as "blow channels". The highly compressed pyrotechnic gas above the piston 36 flows into the exhaust channels 20 laterally under the bus bar 2, after cutting the bus bar 2 and passing the piston 36 blow channel area. Since the arc is burning in this area, the arc is "blown" by the gas into the blow channels 20 too. As a result of this lengthening and cooling of the arc, the voltage drop is further increased until the arc is extinguished. Additionally, the highly compressed pyrotechnical gas from the igniter and the metal filter reduce the ionization.

Figure 8A:
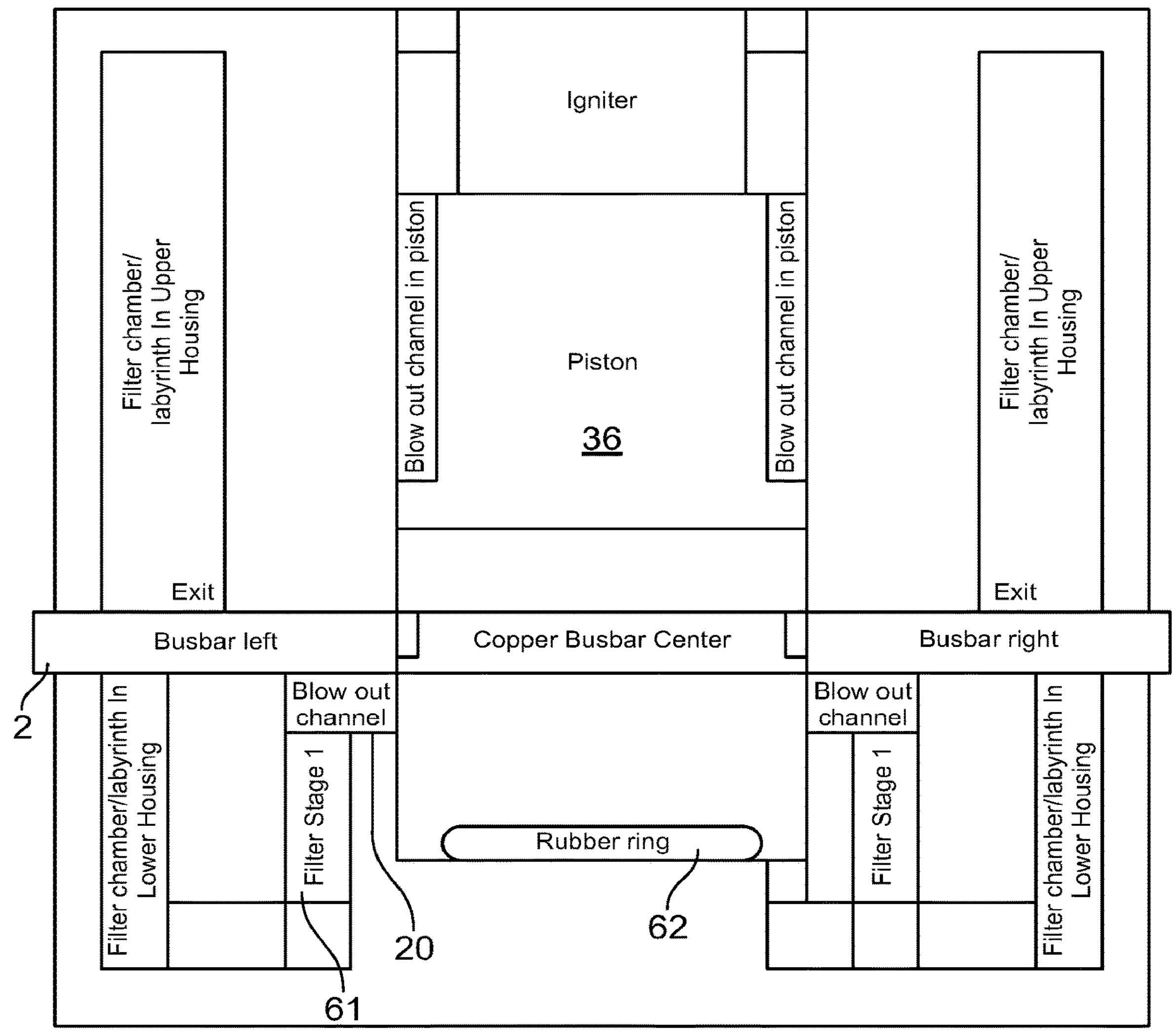
FIG. 8A is a view of the device showing the device with metal filter (filter stage 1) and a second filter stage in standard operation before activation. It is a functional representation for one exemplary use of the device as part of a vehicle crash system.

The gas channels 20 in the lower chamber 18 can lead to an optional filter area which can be labyrinth-like with at least one chamber with pressure compensation, cooling, deionization and filter functions. The first chamber should be filled with a metal filter for deionization and cooling of the arc. The further chamber(s), see FIG. 8A with 2 chambers and 8B with 3 chambers, can be filled with filter material or cooling material, so that as much energy as possible is extracted from the gas/plasma e.g. by means of electric sublimation upon initiation of the very hot gases (plasma from the arc). The sublimation energy also includes the melting heat in addition to the evaporation energy.

The labyrinth with many deflections also slows down heavy particles by impact on the walls and filters it out before the gas escapes. In particular, evaporated copper is to be precipitated from the busbar on the walls, and not completely combusted hot particles of the propellant are slowed down here so that they are completely combusted within the filter. The filter labyrinth with many deflections also serves to slow down heavy particles by impact on the walls and to filter it out before the gas escapes from the outlet. In particular, evaporated copper is to be precipitated from the busbar on the walls, and not completely combusted particles of the propellant are slowed down here so that they are completely combusted within the filter.

Figure 6:
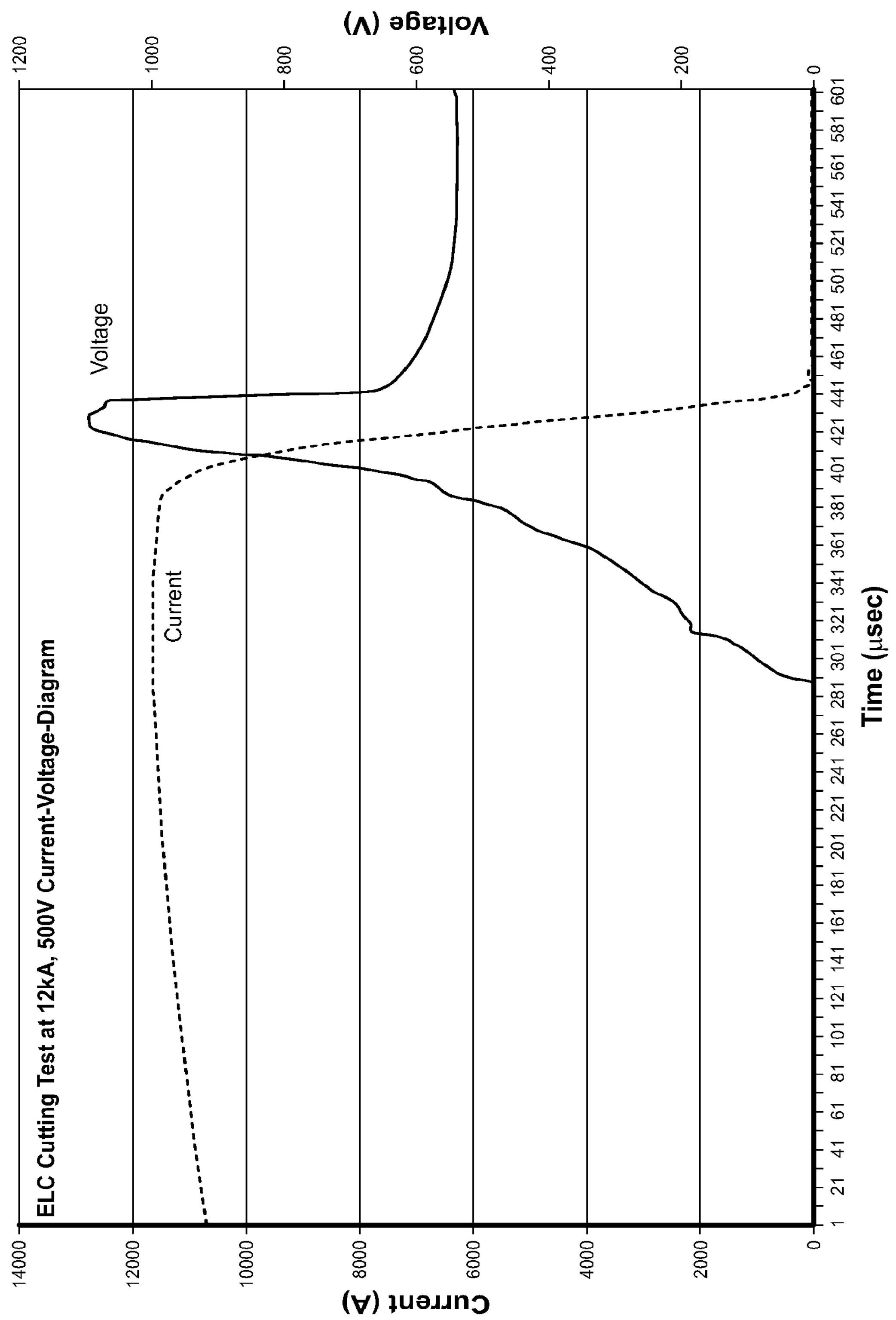
FIG. 6 is a diagram showing the cutting process with voltage and current over time after activation of the device.

The object, as already discussed, of the present invention is to be able to switch off very high currents up to 16 kA and voltages up to 1000 V in a very small space in a very short time <2 msec, as shown in FIG. 6.

The task is solved by a galvanic separation of a busbar 2 using a pyrotechnic device 30, 32, 36 and by extinguishing the electric arc using simultaneously several methods: extension of the arc with simultaneous cooling and squeezing.

Figure 10:
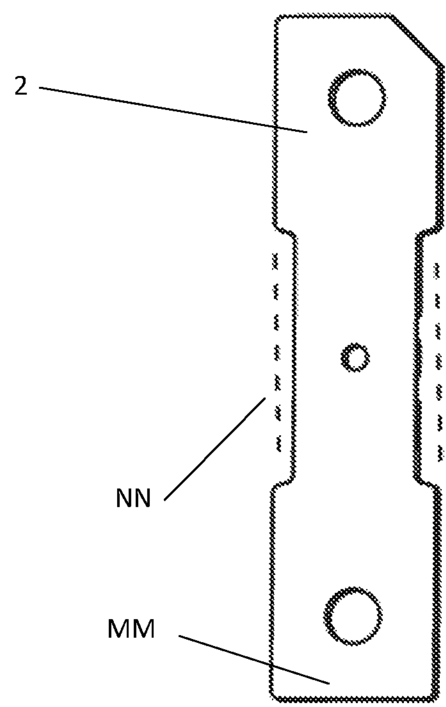
FIG. 10 is a plan view of the bus bar with a preferred shape of the bus bar being generally rectangular with a narrowed center. The phantom lines NN illustrate that the center of the bus bar can be as wide as its opposite ends MM.
Figure 11A:
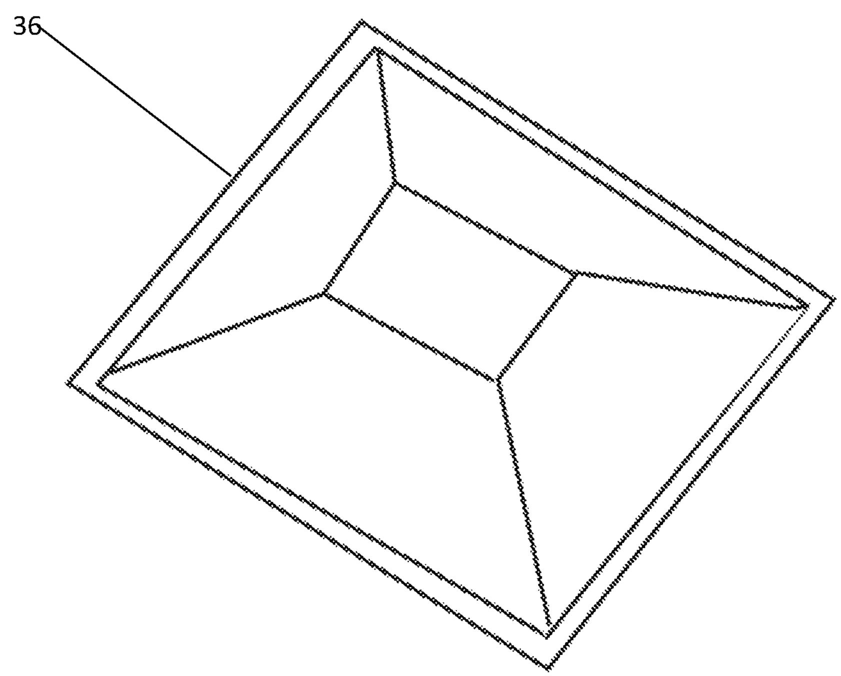
FIG. 11 A is an isometric view and 11B is a plan view that diagrammatically illustrate a pyramidal/prism shaped piston with the chamber 16.
Figure 11B:
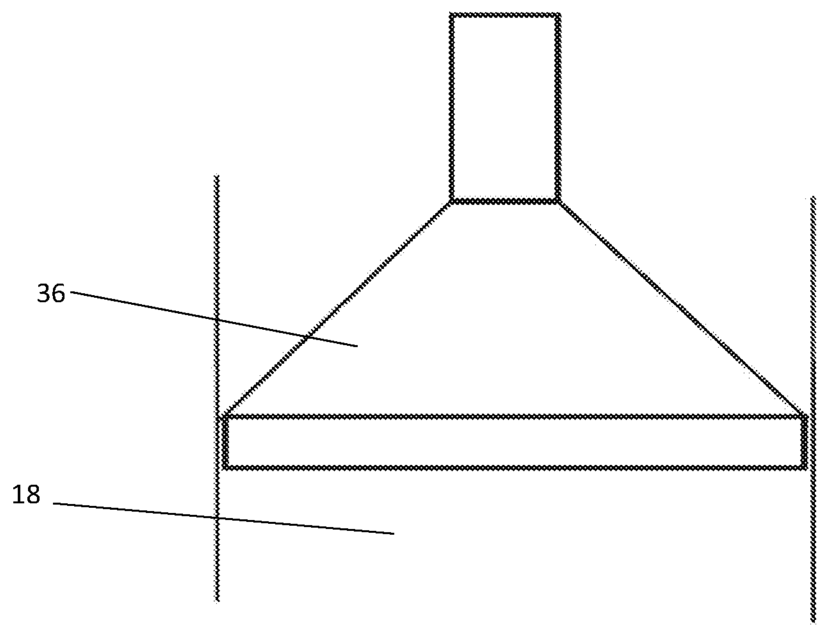

Integrated "blow channels" 20 in the housing and piston support the "blow out" or "blow away" of the electric arc. For this purpose, channels are added in the piston laterally across the width of the busbar, which directs the pyrotechnic gas stream. As soon as the piston 36 has cut the busbar 2 and has reached the exhaust channels 20 below, the emerging electric arc can be blown into the gas outlet channels 20 via the blow channels in the piston. A "squeezing" function for the arc allows a faster arc interruption. The shape of the piston 36 can have different profiles. Different variants of the piston 36 have been tested: one has a round shape without cutting edge, another has a rectangular shape with metal cutting edge. Optional integration of metal arcing plates (not shown) can be placed into the cylinder chamber 18 in the area of the outlet ducts. As well integrated channels inside the piston are considerable to guide the gas from the igniter to the arc plasma right after cutting the busbar. Optionally, an additional metal arc splitter stack shown in FIG. 10 for a higher arc voltage can be placed into the cylinder chamber 18 in the area below the outlet ducts.

Figure 9:
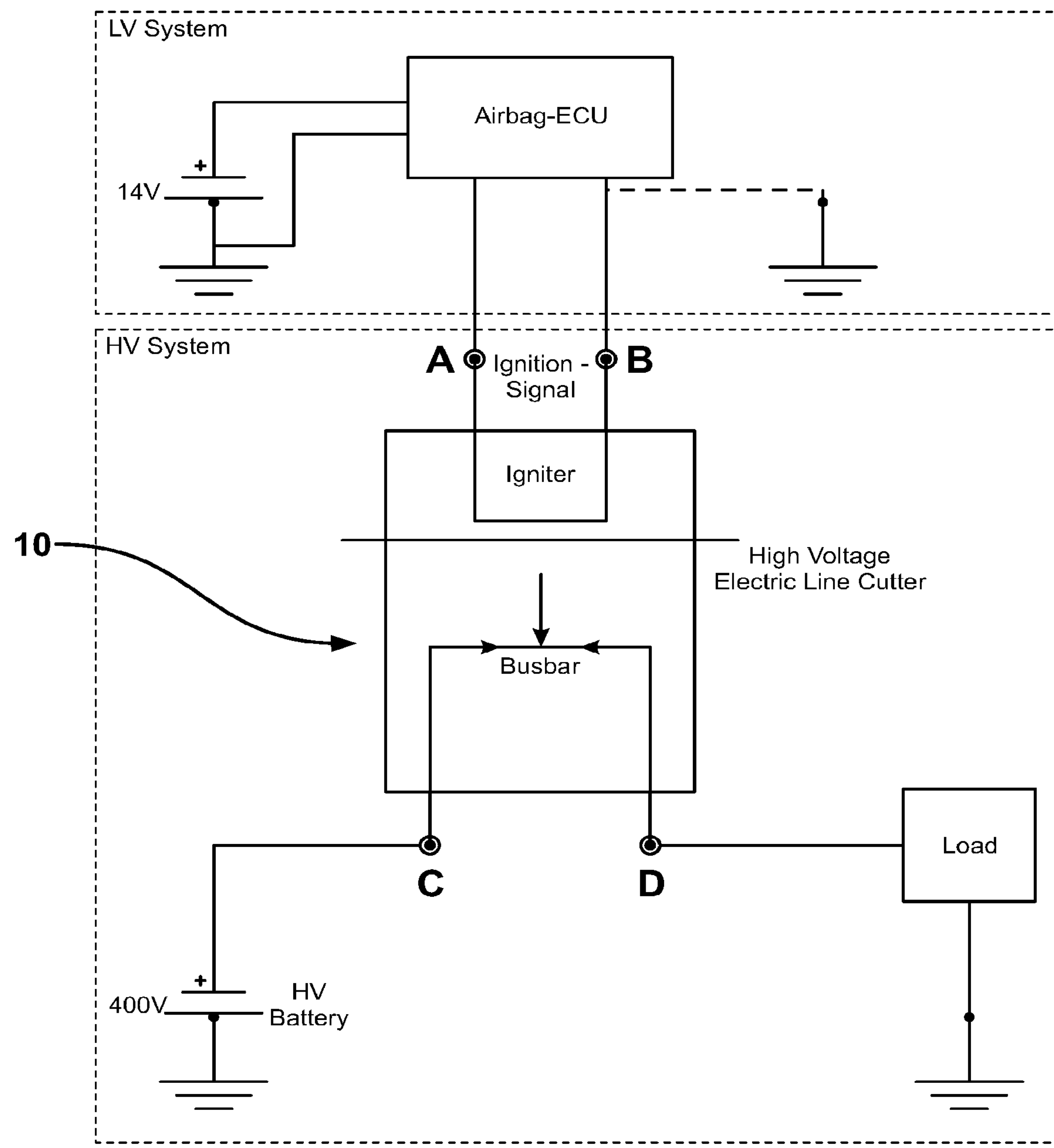
FIG. 9 is an exemplary schematic electric circuit diagram of the device embedded in a vehicle environment.

The piston 36, preferably has an optimized edge profile at the lower end for the efficient cutting of a part of the busbar 2. The piston 36 on the lower side can have cutting edges (not shown). This is to facilitate the cutting of the busbar 2. The cutting edges of the piston 36 can be of both plastic and metal. The cutting edges of the piston have a special cutting profile with which it is possible to influence the arc shape and separation, by way of example inverted V-shape with first cutting at the sides and final cutting in the middle of the rail, FIG. 9. The piston 36 has one or more "blowing channels" through which gases can be conducted. The blowing channels can branch and combine. The inlet cross-section and outlet cross-section may be different. The piston 36 at the lower end has a region which lies flush against the lower chamber 18 or cylinder wall and can thus squeezes, hinders or blocks the electric arc in a "squish area". The piston 36 after ignition is guided in a chamber 16 in the upper housing 12 and then in a chamber 18 in the lower housing 14. The piston 36 can have guide grooves or guide bars or any other guiding profile for the purpose of preventing the twisting or tilting and securing of a correct mounting with the corresponding counter profile for this being in the cylinder, cuboid or prism (not shown).

The upper and lower cylinder, cuboid or prism chambers 16, 18 can have a guide groove or a guide web or any other guiding profile which corresponds to the piston 36. The piston 36 is securely held in the uppermost position until the ignition is triggered, for example a latching lug or a detent projection, FIGS. 4 and 5A.

The lower cylinder, cuboid or prism chamber 18 of the lower housing 14 has a shape or additional profile for decelerating the piston 36.

This can be: a conical cross-section, narrowed down; embedded braking struts with progressive braking effect by constriction; integrated deformable profiles or ribs in the lower region of the chamber 18 capable of absorbing the kinetic energy of the piston 36. Additional deformation elements on the cylinder bottom, for example in the form of a rubber ring 62 could be used.

The piston 36 has a device with which it can be securely held in the lower end position—after triggering the ignition, cutting the busbar 2 and reaching the lower end position (for example a latching lug or a detent projection). The locking profile can also consist of the above-mentioned progressive braking struts, which have a detent projection below which the piston snaps into.

The chamber 18 has a device with which the piston 36 can be securely held in the lower position (for example, a profile into which the piston snaps) after triggering the ignition, cutting the busbar 2 and reaching the lower end position.

The lower cylinder optionally has a relief bore, via which the gas compressed during the downward movement of the piston 36 can flow out into the filter region 61 or outwards which is designed or narrowed in such a way that the compressed gas under the piston 36 is used for deceleration and/or impact damping.

The length of the lower chamber 18 is designed to be sufficient to interrupt the electric arc and to decelerate the piston 36.

The position and profile of the outlet channels 20 are designed in such a way that the arc can be "blown away" to the outside. This is usually done on both sides directly under the busbar across the width of the busbar 2. The outlet ducts can be closed at the outer end, whereby the material of the wall must be so thin at the end that the wall breaks at increased pressure (break point). The outlet ducts in the lower chamber 18 can also be filled with filter material 61 (1st filter stage), preferably made of metal, shown in FIG. 5A.

The filter material 61 below the outlet channels 20 in the lower cylinder consists of metal structures with a large surface area so that the hot gases can be better cooled and deionized by the metal. This also improves the arc extinguishing. The density of the filter material 61 in the outlet channels 20 in the lower chamber 18 is chosen such that the gas pressure is decelerated in a slowed manner and the exiting gases can be cooled longer.

The lower chamber 18 can have one or more metal arcing plates inserted into the wall below the outlet openings.

Figure 8B:
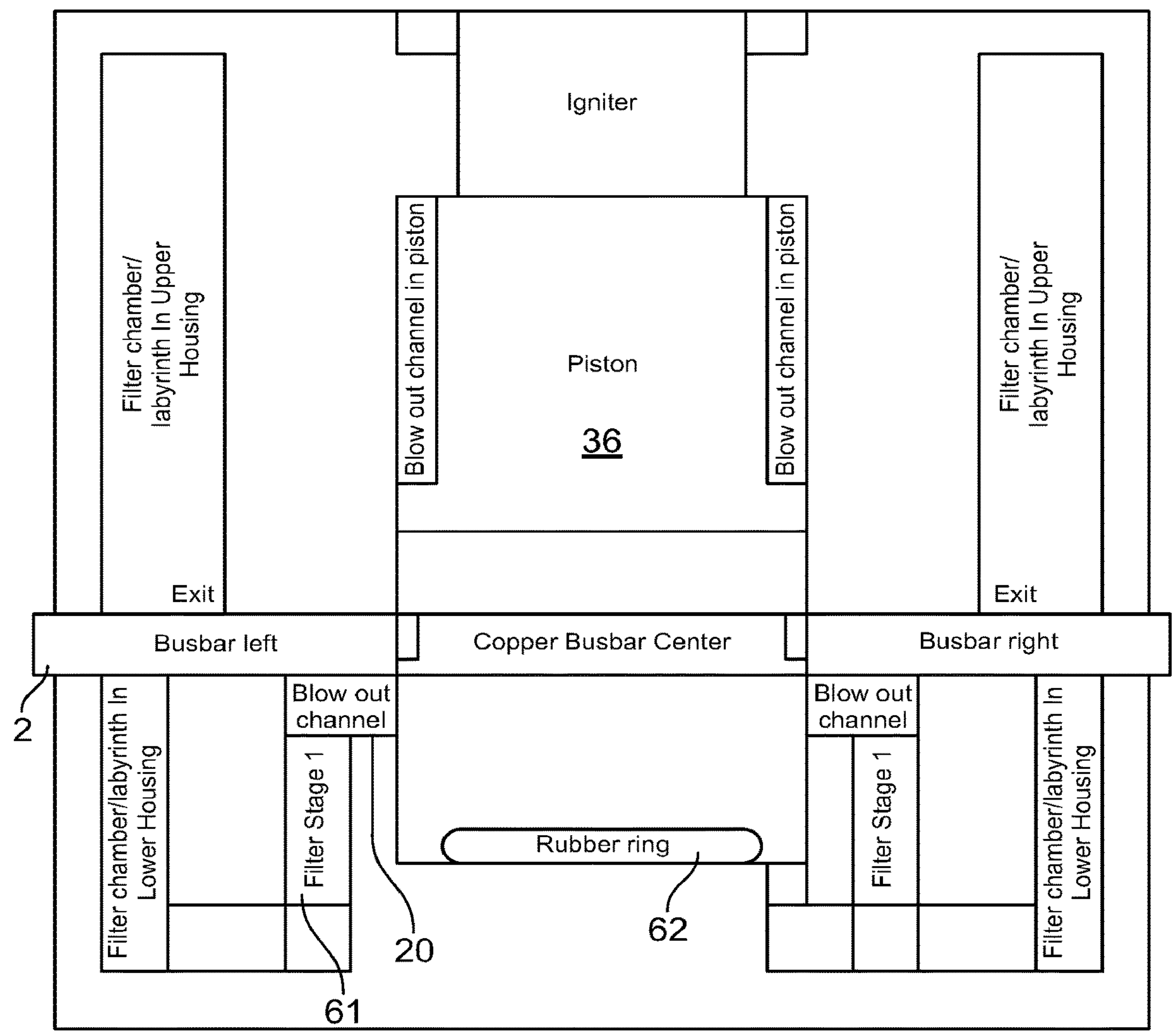
FIG. 8B is a view of the device showing the device with metal filter (filter stage 1) and a second filter stage in the lower housing and a third filter stage in the upper housing in standard operation before activation. It is a functional representation for one exemplary use of the device as part of a vehicle crash system.

The hot gases can be further filtered and cooled in further extended filter area(s). (2nd filter stage, FIG. 8A, 3rd filter stage, FIG. 8B). The filter function can be divided into more than one chamber, FIGS. 8A, 8B. In particular, the two gas streams of the two busbar stub ends 2A, 2B have to be separated by a dividing wall. No gases from the one outlet channel may come together with gases from the other outlet channel within the housings 12, 14 because of the risk of reigniting the electric arc after extinguishing.

A lower filter area (filter pot) as a second filter stage surrounds the lower cylinder in a gas-tight manner. The filter area must have at least two separate chambers for the two gas streams. The gas streams of the first filter stage are introduced into the second filter stage via their outlet channels in the lower part of the lower housing, FIGS. 8A, 8B. An upper and lower filter area (filter pot) surrounds the upper and lower cylinders in a gas-tight manner, both filter sections being connected to one another. Both filter areas must have at least two separate chambers for the two gas streams. An upper and lower filter area (filter pot) are connected to one another in such a way that the gases introduced into the lower filter area can also be transferred into the upper filter area without losses. The aim is to use the entire space for the filtration (filter labyrinth) which is not required for stability.

The chambers in the filter area can be connected with each other with many deflections. Different filter materials can be used in the filter chambers for different pressures, temperatures and gas velocities. One or more filter compartments can be separated by thin walls, which are only opened by the pressure (predetermined breaking walls). The outlet ducts blow off the hot gases from the bottom or top at both sides of the current rail, respectively, directed towards the current rail. The aim is that possibly still present gaseous copper precipitates on the cool current rails and hot gases are further cooled.

By extending and increasing the size of the HV-ELC, it can be adapted to higher currents and voltages.

Figure 7:
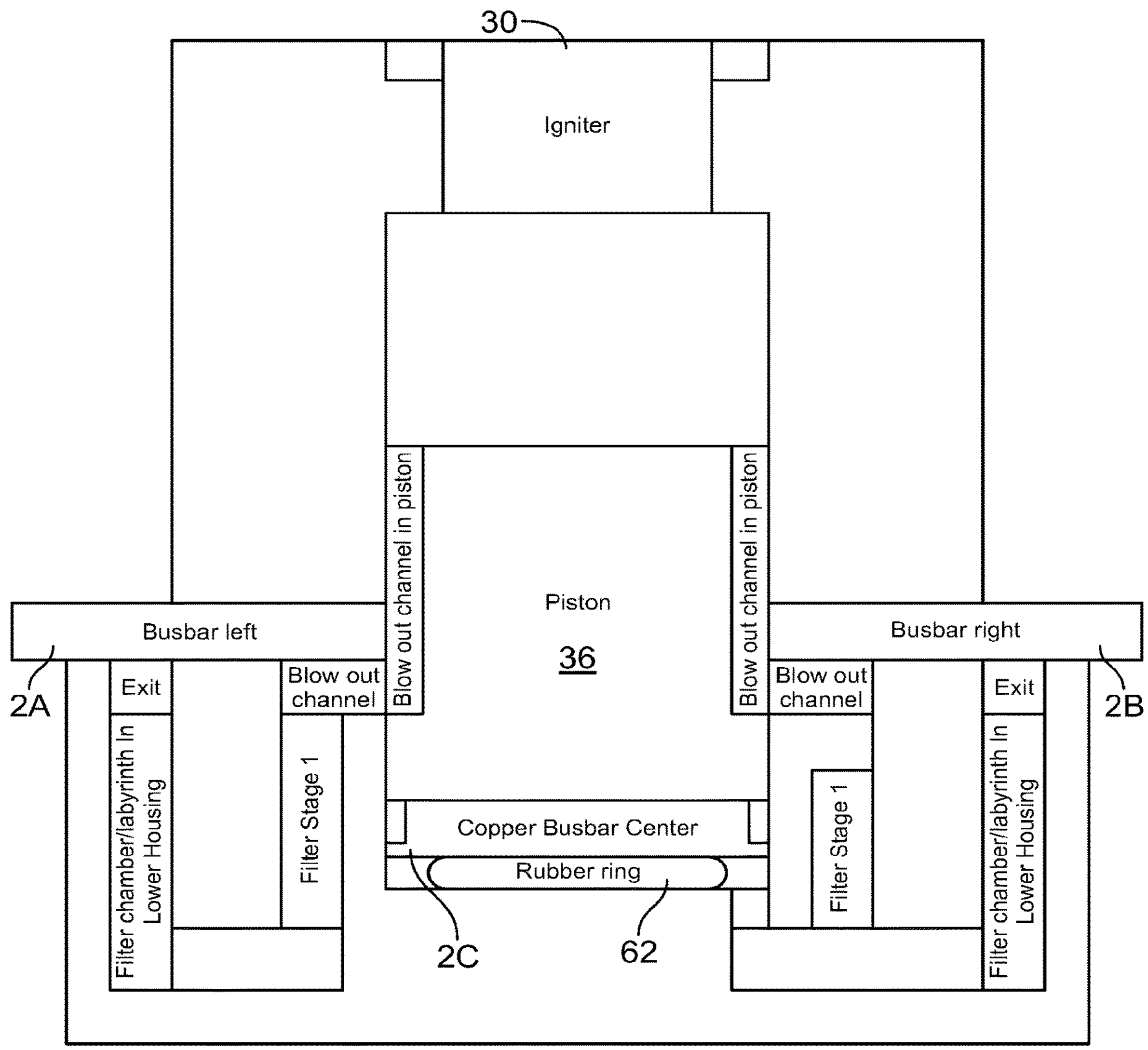
FIG. 7 is a view of the device showing the busbar in the open mode.

As previously mentioned, there are several measures for deceleration of the piston: Conical shape in the lower housing, which is narrowing down from 18.3 mm below busbar to 17.0 mm on the floor. Then the diameter at the piston edge is about 17.5 mm. This should be sufficient to clamp the piston after shooting. Rounded corners in the lower cylinder of the lower housing to reduce the notch effect ("break points" during the hard impact of the piston). Brake knobs on the ground to dampen the impact of the piston, FIG. 7. These knobs should be designed in such a way that they remove as much kinetic energy from the piston as possible with deformation. They can be produced during injection molding of the lower housing.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. An electric line cutter device comprising:
- a first housing with a first housing chamber;
- a second housing with a second housing chamber, the second housing coupled to the first housing;
- a piston disposed within the first housing chamber, the piston having an end portion and a side portion;
- an igniter for driving the piston from the first housing chamber to the second housing chamber; and
- a busbar rigidly held between the first and second housings and spanning across the first and second housing chambers,
- wherein, upon activating the igniter, the end portion of the piston impacts and breaks the busbar and moves a broken portion of the busbar into an end position of the second housing chamber, and
- wherein the side portion of the piston lies flush against a wall of the second housing chamber to hinder or block an electric arc when the piston is at the end position,
- wherein one of the first or second housings define at least one vent passage extending from the first or second housing chamber, respectively, to an area exterior to the one of the first or second housings, and
- wherein the side portion of the piston at least partially defines at least one blow out channel to guide a gas generated by the igniter to the at least one vent passage.

2. The electric line cutter device of claim 1 wherein the piston comprises a non-electrically conductive material.

3. The electric line cutter device of claim 1 wherein the first and second housings comprise a non-electrically conductive material.

4. The electric line cutter device of claim 1 wherein the first and second housings are removably coupled to each other by one or more fasteners.

5. The electric line cutter device of claim 4 wherein the busbar is rigidly coupled by a compression force between the first and second housings on two opposed sides of the first and second housings.

6. The electric line cutter device of claim 5 wherein the busbar has two stub ends extending radially outwardly from the first and second housings, each of the stub ends configured to be attached to electrical wiring or cable to complete a circuit.

7. The electric line cutter device of claim 6 wherein the busbar, when broken, remains rigidly coupled at the two opposed sides of the first and second housing at the stub ends of the busbar.

8. The electric line cutter device of claim 1 wherein the busbar defines a pair of fracture locations, each fracture location including a groove defined by a side of the busbar adjacent to the piston, the fracture locations being configured to break upon an impact from the piston.

9. The electric line cutter device of claim 1 wherein the igniter is electrically activatable by a signal from an Electronic Control Unit (ECU).

10. The electric line cutter device of claim 1 wherein the electric line cutter device is included in a vehicle capable of generating high voltages.

11. The electric line cutter device of claim 10 wherein the electric line cutter device is activatable by an Airbag Electronic Control Unit in the event of a vehicle crash.

12. The electric line cutter device of claim 1 wherein the igniter is a pyrotechnic device and further comprises a propellant charged squib.

13. The electric line cutter device of claim 1 further comprising at least one filter in the at least one vent passage.

14. The electric line cutter device of claim 13 wherein the at least one filter comprises a high temperature resistant material.

15. The electric line cutter device of claim 13 wherein the at least one filter comprises metal, steel, or woven steel.

16. The electric line cutter device of claim 1 wherein the at least one blow out channel is defined between the piston and the first housing prior to activating the igniter.

* * * * *